United States Patent [19]

Nowogrodzki

[11] 4,432,229
[45] Feb. 21, 1984

[54] WHEEL WEAR MEASUREMENT SYSTEM

[75] Inventor: Markus Nowogrodzki, Sussex, N.J.

[73] Assignee: RCA Corporation, New York, N.Y.

[21] Appl. No.: 385,055

[22] Filed: Jun. 4, 1982

[51] Int. Cl.³ .......................................... G01M 17/00
[52] U.S. Cl. ........................................ 73/146; 73/510
[58] Field of Search ...................... 73/146, 510, 511, 2

[56] References Cited

U.S. PATENT DOCUMENTS

| | | | |
|---|---|---|---|
| 3,564,488 | 2/1971 | Higashi et al. | 73/488 |
| 3,924,461 | 12/1975 | Stover | 73/146 |
| 4,058,279 | 11/1977 | Frielinghaus | 246/169 R |
| 4,065,975 | 1/1978 | Giessner | 73/511 |
| 4,103,548 | 8/1978 | McDonald | 73/146 |
| 4,148,027 | 4/1979 | Nowogrodzki | 343/5 SA |
| 4,353,068 | 10/1982 | Fernandez | 73/2 |

Primary Examiner—Donald O. Woodiel
Attorney, Agent, or Firm—Joseph S. Tripoli; Robert L. Troike; Raymond E. Smiley

[57] ABSTRACT

A system for measuring wheel wear of a railroad vehicle includes a first speed measuring device, such as a microwave doppler speed sensor for measuring speed of the vehicle independent of wheel rotation rate, a second speed measuring device for measuring vehicle speed in terms of wheel rotation rate and a comparison device for measuring the difference of the two speed signals over time to therefore provide a signal indicative of wheel wear.

4 Claims, 1 Drawing Figure

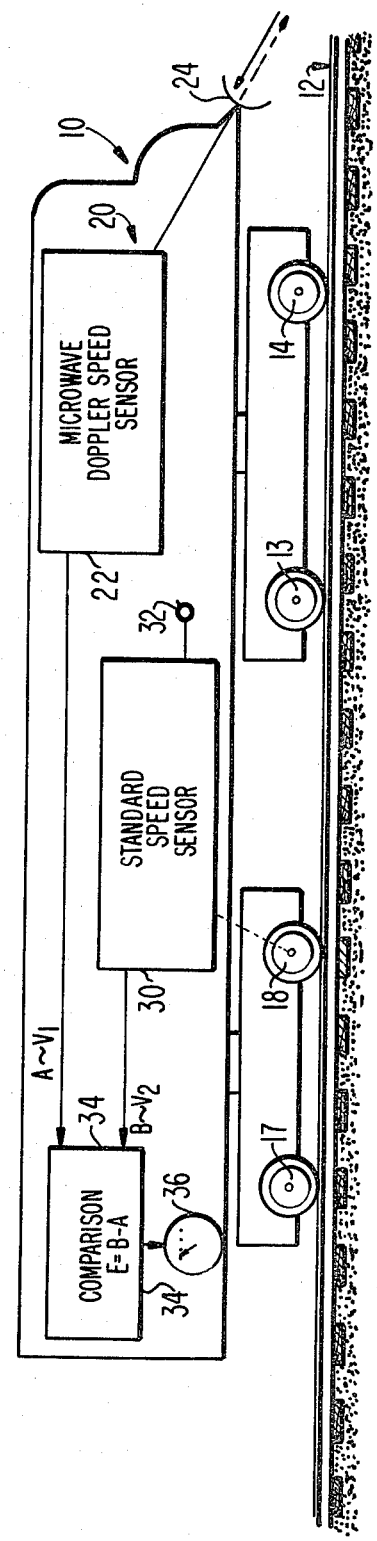

WHEEL WEAR MEASUREMENT SYSTEM

This invention is concerned with a system for measuring wheel wear and more particularly with such systems involving two velocity measuring devices.

Measurement of wheel wear in railroad locomotives and cars is a major problem in the railroad industry since wheels, once worn too small, are dangerous and must be replaced. It is of course possible to manually measure the diameter of railroad wheels but this is inconvenient at best and sometimes impossible due to other parts of the railroad trucks covering the wheels. U.S. Pat. No. 4,103,548 describes a wheel wear monitor which must of necessity be at fixed locations along the railroad line and which does not allow for any flexibility as to the location of measurement.

In accordance with a preferred embodiment of the present invention a system for measuring wear of a wheel on a moving vehicle comprises a first means for providing a signal $V_1$ indicative of true ground related speed of the vehicle, a second means for providing a signal $V_2$ indicative of speed as computed from wheel revolutions per unit time and means for detecting the difference between $V_1$ and $V_2$ at time spaced points at at least one value of $V_1$ to determine therefrom wear of said wheel.

In the drawing:

the sole FIGURE is a railroad vehicle wheel wear measurement system in mechanical and electrical block schematic form.

In the sole FIGURE railroad vehicle 10 rides on rails 12 (only one visible). In a locomotive type railroad vehicle some wheels such as 13 and 14 may be powered by conventional means (not shown) while other wheels such as 17 and 18 may be unpowered. Typically all locomotive wheels are powered but wheels in other railroad cars typically are not powered and the vehicle 10 in the sole FIGURE is intended to be illustrative of both types. Railroad vehicle 10 includes a first means 20 for measuring the speed of vehicle 10 along rails 12 independent of wheel revolution. Means 20 may be a suitable microwave doppler speed sensor radar 22 including a receiving-transmitting antenna 24 which is described in an article entitled "Speed Sensors for Locomotives," by H. C. Johnon, *RCA Engineer*, Vol. 22, No. 2, 1976, pp. 34-37. Such a radar measures the speed of vehicle 10 along rails 12 independent of wheel revolution speed and is included in many modern locomotives. Radar 22 produces, at its output, a signal A proportional to speed $V_1$ of vehicle 10.

A second speed measuring means 30 is a conventional or standard speed sensor which is coupled typically by mechanical means to wheels such as 18 and typically measures speed as a function of wheel revolutions per unit time. Speed sensor 30 produces on its output a signal B which is ideally proportional to and representative of the linear velocity $V_2$ of wheel 18 along rails 12. Attached to speed sensor 30 is a calibration device 32 for adjusting the value of the signal B relative to the diameter of wheel 18 and thus relative to wheel velocity $V_2$. The outputs of first speed sensor 22 and second speed sensor 30 are coupled to a signal comparison circuit 34. Comparison circuit 34 of conventional design produces an output signal E which is a function of the difference between input signals A and B. Circuit 34 is coupled to a suitable display device 36.

Operation of the wheel wear measuring system is as follows: When the wheels are new or at a known state of wear less than that at which they will be replaced, vehicle 10 is operated at a given speed as measured by speed sensor 22 to thus produce a given value A. Calibration device 32 is calibrated until display device 36 produces an indication that value B is equal to or at least proportional to value A at one or more values of speed V1. That is, ideally, V2 should be equal to V1 over all values of V1.

Thereafter as wheel wear occurs on wheel 18 it will make more revolutions per unit time than was the case at the time at which speed sensor 30 was calibrated. As the wheel 18 wears, speed sensor 30 will give an improperly high reading of speed relative to actual speed of vehicle 10 along rails 12. The difference in values between B and A is computed in signal comparison circuit 34 and displayed in a suitable manner on display 36. Since the initial comparison was made at one or more specific speeds the subsequent test should also be made at that same given speed(s). Therefore when error signal E becomes greater than some pre-selected value this is an indication that wheel 18 has worn beyond a desired value and is to be replaced.

It will be understood that wheel 18 is only exemplary. Thus a standard speed sensor 30 may be coupled to wheels in non-powered vehicles such as freight cars or passenger cars. Further it is possible to put a standard speed sensor 30 on every car wheel. It is of course possible to put a standard speed sensor on a powered wheel such as 13 or 14. In the case of a speed sensor 30 being coupled to a powered wheel or for that matter any wheel it is essential that the wheel not be slipping at the time the measurement is made or an improper reading will occur. Thus, to avoid an improper measurement it is best that no power or braking be applied to the wheel the wear of which is being measured.

In the case where the standard speed sensor is mounted in a different railroad vehicle from that which houses the first speed sensors 20, a connection, either by wires or by radio frequency link will have to be made between the two vehicles to enable the voltage comparison circuit 34 to operate as previously described. In the case where multiple standard speed sensors 30 are utilized some sort of multiplexing switch will be coupled between the various speed sensors 30 and voltage comparison circuit 34. It will also be realized that indicator 36 may be a light and/or audio indicator which is triggered when the pre-selected departure of the values B and A, at a given value of A, is exceeded.

Speed sensor 20 may be mounted, not on a moving vehicle 10, but rather alongside the rails 12. Then signals from speed sensor 20 will be transmitted to comparison circuit 34 mounted in vehicle 20 or signals from the one or more sensors 30 will be transmitted to circuit 34 which is fixed relative to the rails.

It will also be obvious that the system described herein can be used to recalibrate standard speed sensors at different amounts of wheel wear. In this mode of operation, calibrating device 32 is adjusted so that standard speed sensor 30 provides an output signal B which is identical to signal A provided by speed sensor 20 at a particular amount of wheel wear not deemed sufficiently severe to warrant wheel replacement.

What is claimed is:

1. A system for measuring wear of a wheel on a moving vehicle comprising in combination:

first means for providing a signal $V_1$ indicative of the measurement of the actual velocity of said vehicle independent of wheel motion;

second means of providing a signal $V_2$ indicative of revolutions per unit time of said wheel; and means responsive to signals $V_1$ and $V_2$ for determining the difference between $V_1$ and $V_2$ at time spaced points at at least one value of $V_1$ to determine therefrom wear of said wheel.

2. Combination as set forth in claim 1 wherein said first means comprises a microwave doppler speed sensor.

3. Combination as set forth in claim 1 or claim 2 wherein said first means is mounted on said vehicle.

4. Combination as set forth in claim 1 or claim 2 wherein said vehicle is a railroad type vehicle.

* * * * *